Patented June 28, 1938

2,121,919

UNITED STATES PATENT OFFICE 2,121,919

METHOD OF PURIFICATION AND SEPARATION OF STARCH

Karl Paul Link, Carl G. Niemann and Ray H. Roberts, Madison, Wis., assignors to Wisconsin Alumni Research Foundation, Madison, Wis., a corporation of Wisconsin No Drawing. Application September 22, 1933, Serial No. 690,562. Renewed December 9, 1937

4 Claims. (Cl. 127—70)

Our invention relates to the purification and separation of a starch polysaccharide from starch-containing plant tissues or materials, such as stems and other woody tissues, leaves, roots, tubers, bulbs, fruits, seeds and commercial starch and starch preparations.

One of the objects of our invention is to provide a process of starch purification for freeing the basic starch polysaccharide of color impurities such as chromogens, and of ash, nitrogenous constituents, hemicellulose and other substances, such as lipoids, odoriferous and gustative materials, without affecting a chemical degradation of the basic starch polysaccharide.

Another object is to reduce the cost and increase materially the percentage of yield of starch recovered from plant tissues over that which is possible with the recognized and commercially practiced methods, and thus eliminate the waste of inseparable starch which now prevails in these commercial methods.

A further object of our invention is to bring about the recovery of starch from plant tissues and at the same time produce a chemically pure, colorless starch polysaccharide, free from ash, nitrogenous constituents, hemicelluloses and other substances.

A further object is to produce from the starch-containing tissue mass or material a purified starch polysaccharide solution which can be directly hydrolyzed in the preparation of such products as sirups, glucose and maltose, without the necessity of a series of expensive and cumbersome purification steps such as are now employed in commercial methods after the starch grains have been separated from the tissue mass.

The application of the process to and the use of the process in the production of a pure starch polysaccharide is equally effective for the purification of the starch polysaccharide at any stage in the manufacture of commercial starch from the raw plant tissues to the final commercial starches or starch preparations, whatever the source of raw material may be.

The recognized and commercially practiced methods of starch separation are based upon the theory of physical separation of the starch granules from the tissue mass. In accordance with these methods the tissue mass, including all of the impurities and color constituents, is carried along through numerous steps or operations which eventually separate, by physical or mechanical action, the starch granules and the tissue residue. However, at this stage where the starch is separated from the tissue residue, the starch still retains the impurities and color constituents. It then becomes necessary for the starch granules to go through a further series of expensive and prolonged washing, filtration or other physical separation treatments in an attempt to remove the impurities from the raw starch granules.

Our invention is based upon the chemical treatment of the impurities in the starch-containing material for the purpose of chemically removing impurities from the starch granule and leaving the pure basic starch polysaccharide unaffected by the treatment.

The essential part of our process is the subjection of the starch-containing material to the action of a solvent combined with oxidizing, substituting and partially hydrolyzing agents, which act upon and take into solution only the impurities including those which color the starch, and the separation of the starch from this solution.

Our process, therefore, involves the subjection of the starch-containing material in suspension to the action of a suitable reagent in a solvent consisting of an aqueous alcohol mixture in which the basic starch polysaccharide is insoluble under the specific conditions hereinafter described and in which all or part of the impurities or the products produced by the reagent acting upon the impurities are either soluble in the reagent and solvent mixture or are transformed into or left in a state where they are insoluble in water. In this sense, therefore, the reagent combined with the solvent is differential in the performance of the function of hydrolysis, oxidation and substitution of the impurities and not of the starch polysaccharide. In other words, the presence of these solvents in the combination with the reagents impart to the reagents the properties of differentiation between the starch and the impurities. After the above treatment, the solvent and reagent containing the soluble impurities is separated from the insoluble starch polysaccharide.

It is essential that the combined solvent and agent used for the purpose shall have the properties of differentiation between the impurities and the starch polysaccharide, in order to be effective in oxidizing, substituting and hydrolyzing the known impurities and not the starch polysaccharide. The classes of solvents and oxidizing, substituting and hydrolyzing agents which we have found to be differential in their action to bring about the solution of the impurities are:

(A) The oxides of nitrogen or their acids in aqueous ethyl alcohol or other aqueous alcohols and aqueous polyhydric glycols as solvents, wherein the alcohol concentration is not less than 56% and the acid concentration is not more than 4.0%.

A typical example of solvent and agent, and the proportions thereof in this class, is 1.0% nitric acid in 85% ethyl alcohol.

(B) The halogens, oxyhalogens and oxyhalogen acids with alcohols or polyhydric glycols as solvents.

A typical example of solvent and agent, and the proportions thereof in this class, is free chlorine, not greater than 4.0% in 60% to 95% ethyl alcohol.

Either of the before mentioned typical solutions is preferable from a commercial standpoint to other solutions in these classes, because of their relatively lower cost and availability.

In practice, in the production of commercial starch, the plant tissue is prepared for treatment by being ground, rolled, shredded or crushed, either dry or in the wet condition following steeping. Any of the well known methods and apparatus for this preparation of the tissue may be employed. For instance, if the so-called dry method is used, the dry plant tissue is prepared by grinding or crushing to reduce it to a comminuted or pulverized condition. In this condition it may then be directly subjected to our treatment for the removal of impurities without further preparation. On the other hand, if the so-called wet process is used for preparing the tissue, the tissue mass is steeped in water and sulphurous acid and then crushed or otherwise reduced to a comminuted condition and in the case of grains the embryo is removed in the usual way.

After preparation of the starch-containing materials as above described, we subject the mass to any of the solutions in the above classes to bring the impurities into solution or convert them into compounds insoluble in the solvent and reagent solution or in water. If the ethyl alcohol-dilute nitric acid solution above mentioned is used, the prepared starch-containing mass is subjected to this solution for a period of time ranging from about ten minutes to several hours, depending upon the character of the tissues and the length of time required to dissolve or convert the impurities as just mentioned. The starch-containing mass and solution are preferably treated in a suitable digester at the boiling temperature of the solvent and reagent solution or above the boiling point of the solvent and reagent solution under pressure. The combined solvent and agent takes into solution or makes insoluble by differential oxidation, substitution and hydrolysis, the known impurities, such as certain ash constituents, lipoids, pentosans non-starch polysaccharides and nitrogenous compounds, physically associated or chemically combined with the starch polysaccharides in the mass, the reactions being such as to convert these impurities into compounds some of which are soluble in the solvent and reagent solution used, and others of which are insoluble in the solvent and reagent solution or in water, and leaving pure starch grains which, of course, are insoluble in the solvent and reagent solution. The solvent and reagent solution which now contains part of the impurities is then removed from the starch polysaccharide grains and tissue mass by any well known separating method such as flotation, filtration, or centrifugation.

After the solution containing the impurities has thus been removed or separated from the mass, there remains purified starch polysaccharide granules and tissue residue, such as cellulose and fibrous material, including the impurities which have been made insoluble, as above mentioned, in the solvent and reagent solution or in water, which can be separated and treated according to the product desired. For instance, if dry starch is desired, the pure starch polysaccharide granules can simply be separated from the cellulose residue by flotation and then washed, collected and dried. If starch polysaccharide in water solution is desired, the pure starch and tissue mass above mentioned can be again placed in a digester and the starch polysaccharide dissolved in hot water or in hot dilute alcohol (20% or less), or in salt solution and the cellulose residue separated from the hot water, dilute alcohol or salt solution used by flotation, filtration or centrifugation. Chemically pure water soluble dry starch polysaccharide can then be obtained from this solution by precipitation of the starch polysaccharide from the alcohol, water or salt solution.

The starch polysaccharide in dilute alcohol, water or salt solution above mentioned thus constitutes a source of pure starch for any desired purpose. To again illustrate, the starch polysaccharide can be precipitated from the solution and used as such, or the solution can be directly hydrolyzed for the production of sirups or crystalline products, or the solution can be treated for any other purpose requiring a chemically pure starch polysaccharide.

As herein before stated, our process is applicable to the purification of the starch polysaccharide in any stage in the production of starch. It is to be understood that this includes the treatment of commercial starch produced by any of the known methods from any source of raw material. It is well known that commercial starch contains many impurities such as ash constituents, lipoids, non-starch polysaccharides, pentosans and nitrogenous compounds, which the commercial methods of manufacture do not remove. If it is desired to purify such commercial starch and separate therefrom pure starch polysaccharide which is soluble in hot water, such commercial starch either dried or in a refined wet state is subjected to either of the classes of differentially acting solutions of solvents and oxidizing, substituting and hydrolyzing agents described in (A) and (B) above, in the same manner but for lesser periods of time, say from 10 to 30 minutes, than required for the treatment of starchy masses containing a greater amount and number of impurities.

The term "starch-containing material" herein used, is intended to include commercial starch which has been produced by any of the known methods from any source of raw material.

We claim:

1. The method of treating starch-containing material for the removal of impurities which consists in subjecting the starch-containing material to the action of nitric acid in an aqueous alcohol solution wherein the concentration is not less than 56% to bring the impurities into solution, and separating off the dissolved impurities.

2. The method of treating starch-containing material for the removal of impurities from the starch polysaccharide which consists in subjecting the starch-containing material to the action of a solution of 1.0% nitric acid in 85% ethyl alcohol to bring the impurities into solution, and separating off the dissolved impurities.

3. The method of purifying starch polysaccharide, which consists in subjecting the material containing the starch polysaccharide and impurities in a comminuted state, to the action of nitric acid and combining therewith an aqueous alcohol in sufficient concentration to confine the action of the nitric acid to the impurities in said material, thereby converting the impurities into compounds capable of separation from the starch polysaccharide, and then separating the unaffected starch polysaccharide from the converted impurities.

4. The method of treating starch-containing material for the removal of impurities, including the combined lipoids and phosphorous, which consists in subjecting the starch-containing material to the action of nitric acid combined with an aqueous alcohol solution in sufficient concentration to confine the action of the nitric acid to conversion of said impurities into compounds capable of separation from the starch polysaccharide and then separating the unaffected starch polysaccharide from the converted impurities.

KARL PAUL LINK.
CARL G. NIEMANN.
RAY H. ROBERTS.